United States Patent
Nordin et al.

(10) Patent No.: US 11,332,595 B2
(45) Date of Patent: May 17, 2022

(54) THERMALLY EXPANDABLE MICROSPHERES PREPARED FROM BIO-BASED MONOMERS

(71) Applicant: NOURYON CHEMICALS INTERNATIONAL B.V., Arnhem (NL)

(72) Inventors: Ove Nordin, Kvissleby (SE); Magnus Jonsson, Sundsvall (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 64 days.

(21) Appl. No.: 16/644,448

(22) PCT Filed: Sep. 4, 2018

(86) PCT No.: PCT/EP2018/073653
§ 371 (c)(1),
(2) Date: Mar. 4, 2020

(87) PCT Pub. No.: WO2019/043235
PCT Pub. Date: Mar. 7, 2019

(65) Prior Publication Data
US 2020/0216631 A1    Jul. 9, 2020

(30) Foreign Application Priority Data

Sep. 4, 2017 (EP) .................... 17189154

(51) Int. Cl.
| C08J 9/20 | (2006.01) |
| C08J 9/00 | (2006.01) |
| C08J 9/14 | (2006.01) |
| C08J 9/228 | (2006.01) |
| B01J 13/18 | (2006.01) |

(52) U.S. Cl.
CPC ............ *C08J 9/20* (2013.01); *C08J 9/0066* (2013.01); *C08J 9/141* (2013.01); *C08J 9/228* (2013.01); *B01J 13/185* (2013.01); *C08J 2201/034* (2013.01); *C08J 2203/14* (2013.01); *C08J 2325/06* (2013.01); *C08J 2367/04* (2013.01)

(58) Field of Classification Search
CPC ....................................................... C08J 9/20
See application file for complete search history.

(56) References Cited

U.S. PATENT DOCUMENTS

| 3,615,972 A | 10/1971 | Morehouse, Jr. |
| 3,945,956 A | 3/1976 | Garner |
| 4,287,308 A | 9/1981 | Nakayama et al. |
| 5,536,756 A | 7/1996 | Kida et al. |
| 6,388,036 B1 * | 5/2002 | Gridnev .......... C08F 24/00 526/270 |
| 6,509,384 B2 | 1/2003 | Kron et al. |
| 7,956,096 B2 * | 6/2011 | Nordin ............ B01J 13/14 521/56 |
| 8,846,817 B2 * | 9/2014 | Yontz ............. C08F 224/00 525/327.2 |
| 2001/0051666 A1 | 12/2001 | Kron et al. |
| 2003/0171522 A1 * | 9/2003 | Brandenburg ....... C08F 224/00 526/305 |
| 2006/0000569 A1 * | 1/2006 | Kron ................ D21H 21/22 162/168.1 |
| 2006/0100447 A1 | 5/2006 | Manzer et al. |
| 2012/0053256 A1 | 3/2012 | Chen et al. |
| 2014/0037837 A1 * | 2/2014 | Overbeek ........... C08F 20/12 427/136 |
| 2020/0347197 A1 * | 11/2020 | Nordin .............. C08J 9/009 |

FOREIGN PATENT DOCUMENTS

| CN | 1426323 A | 6/2003 |
| CN | 102382435 A | 3/2012 |
| CN | 103554325 A | 2/2014 |
| CN | 104014287 A | 9/2014 |

(Continued)

OTHER PUBLICATIONS

EPO, European Extended Search Report issued in European Application No. 17189154.2, dated Sep. 4, 2017.

(Continued)

*Primary Examiner* — Irina Krylova
(74) *Attorney, Agent, or Firm* — Lorenz & Kopf, LLP

(57) ABSTRACT

The present invention relates to thermally expandable microspheres at least partially prepared from bio-based monomers and to a process of their manufacture. The microspheres comprise a thermoplastic polymer shell encapsulating a blowing agent, wherein the thermoplastic polymer shell comprises a polymer being a homo- or copolymer of a lactone according to formula (1):

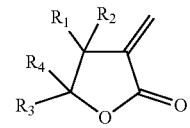

wherein each of $R_1$, $R_2$, $R_3$, $R_4$, separately from one another, is selected from the group consisting of H and an alkyl group preferably with 1-4 carbon atoms. The invention further provides expanded microspheres, which can be used in a variety of applications.

6 Claims, No Drawings

(56) References Cited

FOREIGN PATENT DOCUMENTS

| | | |
|---|---|---|
| EP | 0348372 A2 | 12/1989 |
| EP | 0486080 A2 | 10/1991 |
| EP | 1149628 A1 | 10/2001 |
| JP | 2003531928 A | 10/2003 |
| JP | 2013542313 A | 11/2013 |
| WO | 2004056549 A1 | 7/2004 |
| WO | 2004072160 A1 | 7/2004 |
| WO | 2006009643 A2 | 1/2006 |
| WO | 2007091960 A1 | 8/2007 |
| WO | 2018011182 A1 | 1/2018 |
| WO | 2019101749 A1 | 5/2019 |

OTHER PUBLICATIONS

EPO, International Search Report and Written Opinion issued in International Application No. PCT/EP2018/073653, dated Sep. 4, 2018.

Database WPI, Week 201479, Thomson Scientific, London, GB; AN 2014-V26831, XP002778507, & CN104014287A, Sep. 3, 2014.

\* cited by examiner

THERMALLY EXPANDABLE MICROSPHERES PREPARED FROM BIO-BASED MONOMERS

CROSS-REFERENCE TO RELATED APPLICATION

This application is a U.S. National-Stage entry under 35 U.S.C. § 371 based on International Application No. PCT/EP2018/073653, filed Sep. 4, 2018, which was published under PCT Article 21(2) and which claims priority to European Application No. 17189154.2, filed Sep. 4, 2017, which are all hereby incorporated in their entirety by reference.

TECHNICAL FIELD

The present invention relates to thermally expandable microspheres at least partially prepared from bio-based monomers and to a process of their manufacture. The invention further provides expanded microspheres prepared from the thermally expandable microspheres.

BACKGROUND ART

Thermally expandable microspheres are known in the art, as disclosed in, for example, U.S. Pat. No. 3,615,972 and WO 2007/091960. Thermally expandable microspheres comprise a shell of a thermoplastic resin and a blowing agent (propellant) encapsulated therein. Upon heating the thermoplastic shell softens and simultaneously the blowing agent volatilizes while being retained within the thermoplastic shell, which in turn causes an expansion of the thermally expandable thermoplastic microspheres to form expanded microspheres. Expandable microspheres are marketed in various forms, e.g. as dry free-flowing particles, as aqueous slurry or as a partially dewatered wet cake.

Expandable microspheres can be produced by polymerizing ethylenically unsaturated monomers in the presence of a blowing agent. Conventional monomers used to form the polymer for the thermoplastic shell are a mixture of vinyl containing monomers, such as, vinylidene chloride, acrylonitrile, methyl methacrylate, methyl acrylate, methacrylonitrile and methacrylic acid in various combinations. Conventional monomers are used as they impart thermoplastic properties to the thermoplastic shell ensuring that the thermally expandable thermoplastic microspheres expand satisfactorily when heated to form the expanded microspheres whilst retaining the blowing agent therein.

Conventional monomers are generally produced from petrochemicals which originate from fossil fuels. Therefore, there is a growing need in polymers produced at least partially from monomers obtained from renewable sources (bio-based monomers).

However, replacement of conventional monomers by bio-based monomers is not easy because the bio-based monomers need to meet the demands of the conventional monomers and be compatible with these to form a polymer. In order to make expandable microspheres from the polymers there are even more requirements. First, the polymer must have the right surface energy to get a core-shell particle in a suspension polymerization reaction so that the blowing agent is encapsulated. Second, the produced polymer must have good gas barrier properties to be able to retain the blowing agent. Finally, the polymer must have suitable viscoelastic properties above glass transition temperature Tg so that the shell can be stretched out during expansion. In addition, other objects, desirable features and characteristics will become apparent from the subsequent summary and detailed description, and the appended claims, taken in conjunction with the accompanying drawings and this background.

SUMMARY OF THE INVENTION

It has surprisingly been found that the above requirements are met when the polymer is at least partially produced from a certain group of unsaturated lactones as a (co)monomer, and that it is possible to obtain thermally expandable microspheres with good expansion properties from the homo- and copolymers of these lactones.

Accordingly, the present invention provides, in a first aspect, thermally expandable microspheres comprising a thermoplastic polymer shell encapsulating a blowing agent, wherein the thermoplastic polymer shell comprises a polymer being a homo- or copolymer of a lactone with formula (1):

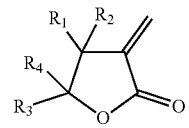

wherein each of $R_1$, $R_2$, $R_3$, $R_4$, separately from one another, is selected from the group consisting of H and an alkyl group preferably with 1-4 carbon atoms.

In a further aspect, the present invention relates to a process for the manufacture of thermally expandable microspheres comprising aqueous suspension polymerization of ethylenically unsaturated monomer(s) using a free-radical initiator in the presence of a blowing agent, wherein at least one ethylenically unsaturated monomer is the lactone according to formula (1).

In a further aspect, the invention relates to expanded microspheres obtained by thermal expansion of the microspheres of the invention.

DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description.

The thermoplastic polymer shell of the microspheres according to the invention comprises a homopolymer or a copolymer of the lactone according to formula (1):

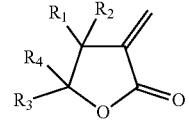

wherein each of $R_1$, $R_2$, $R_3$, $R_4$, separately from one another, is selected from the group consisting of H and an alkyl group. The alkyl group preferably contains 1-4 carbon atoms. Particularly preferred alkyl groups are methyl and ethyl. More preferably, each of $R_1$, $R_2$, $R_3$, $R_4$, separately from one another, is selected from the group consisting of H and $CH_3$.

In preferred embodiments, $R_1$, $R_2$, $R_3$, and $R_4$ in formula (1) are selected as follows:

$R_1$=H, $R_2$=H, $R_3$=CH$_3$, $R_4$=H (α-methylene-γ-valerolactone (MVL), same as γ-methyl-α-methylene-γ-butyrolactone), $R_1$=H, $R_2$=H, $R_3$=H, $R_4$=H (α-methylene-γ-butyrolactone (MBL)), $R_1$=CH$_3$, $R_2$=H, $R_3$=H, $R_4$=H (β-methyl-α-methylene-γ-butyrolactone (MMBL)), or $R_1$=H, $R_2$=H, $R_3$=CH$_3$, $R_4$=CH$_3$ (γ,γ-dimethyl-α-methylene-γ-butyrolactone).

More preferably, the lactone is either MVL or MBL.

In some embodiments, the polymer is a homopolymer of the lactone according to formula (1), which means there are no comonomers.

In other embodiments, the polymer is a copolymer of the lactone according to formula (1) with other ethylenically unsaturated monomers. Preferably, the ethylenically unsaturated comonomers are mono-unsaturated. Suitable mono-unsaturated comonomers are for example (meth)acrylates; vinyl esters; styrenes such as styrene and α-methylstyrene; nitrile-containing monomers; (meth)acrylamides; vinylidene halides, vinyl chloride, vinyl bromide and other halogenated vinyl compounds; vinyl ethers such as methyl vinyl ether, ethyl vinyl ether; N-substituted maleimides; dienes such as butadiene, isoprene and others; vinyl pyridine; and any combination thereof.

Particularly preferred comonomers are selected from the list consisting of (meth)acrylonitrile, methyl (meth)acrylate, vinylidene chloride, methacrylic acid, methacrylamide or any combination thereof.

By "(meth)acrylate monomers" it is meant a compound and isomers thereof according to the general formula:

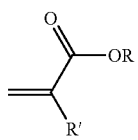

wherein R can be selected from the group consisting of hydrogen and an alkyl containing from 1 to 12 carbon atoms and R' can be selected from the group consisting of hydrogen and methyl. Examples of (meth)acrylate monomers are acrylic acid and salts thereof, methacrylic acid and salts thereof, acrylic anhydride, methacrylic anhydride, methyl acrylate, methyl methacrylate, ethyl acrylate, propyl acrylate, butyl acrylate, butyl methacrylate, propyl methacrylate, lauryl acrylate, 2-ethylhexylacrylate, ethyl methacrylate, isobornyl methacrylate, hydroxyethyl (meth)acrylate, hydroxypropyl (meth)acrylate, polyethylene glycol (meth) acrylate. Preferred (meth)acrylate monomers include methyl acrylate, methyl methacrylate and methacrylic acid.

By vinyl ester monomers it is meant a compound and isomers thereof according to the general formula:

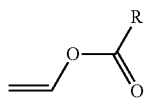

wherein R can be selected from an alkyl containing from 1 to 17 carbon atoms. Preferred vinyl ester monomers are vinyl acetate, vinyl butyrate, vinyl stearate, vinyl laurate, vinyl myristate and vinyl propionate.

By nitrile containing monomers it is meant a compound and isomers thereof according to the general formula:

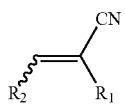

wherein $R_1$ and $R_2$ can be selected, separately from each other, from the group consisting of hydrogen and an alkyl containing from 1 to 17 carbon atoms, or a nitrile group.

Examples of nitrile containing monomers are acrylonitrile (R1=R2=H), methacrylonitrile (R1=CH3, R2=H), fumaronitrile (R1=CH3, R2=CN), crotonitrile (R1=CH3, R2=CH$_3$). Preferred nitrile containing monomers are acrylonitrile and methacrylonitrile.

By (meth)acrylamide monomers it is meant a compound and isomers thereof according to the general formula:

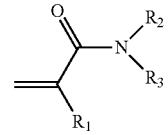

wherein $R_1$, $R_2$ and $R_3$ can be selected, separately from each other, from the group consisting of hydrogen and an alkyl containing from 1 to 17 carbon atoms or hydroxyalkyl.

Preferred (meth)acrylamide monomers are acrylamide (R1=R2=R3=H), methacrylamide (R1=CH3, R2=R3=H), and N-substituted (meth)acrylamide monomers such as N,N-dimethylacrylamide (R1=H, R2=R3=CH3), N,N-dimethylmethacrylamide (R1=R2=R3=CH$_3$), N-methylolacrylamide (R1=H, R2=H, R3=CH2OH).

By N-substituted maleimide monomers it is meant a compound according to the general formula:

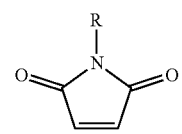

wherein R can be selected from an alkyl containing from 1 to 17 carbon atoms, or halogen atom.

Preferred N-substituted maleimide monomers are those where R is selected from the group consisting of H, CH3, phenyl, cyclohexyl and halogen. It is preferable that R is selected from the group consisting of phenyl and cyclohexyl.

In embodiments, at least one of the one or more ethylenically unsaturated comonomers is selected from (meth) acrylate monomers and nitrile-containing monomers. In further embodiments, at least one comonomer is selected from acrylic acid, methacrylic acid, acrylonitrile, methacrylonitrile and C1-12 alkylacrylates and methacrylates, for example those where the C1-12 alkyl group is methyl.

The lactone (co)polymer preferably contains at least 1 wt. % of the lactone, more preferably at least 10 wt. %, yet more preferably at least 20 wt. % of the lactone based on the total weight of the polymer. Higher amounts of the lactone are also possible, such as at least 40 wt. %, or at least 50 wt. %, or at least 60 wt. %. In some embodiments, the lactone constitutes 75-100 wt. % of the (co)polymer, more preferably 85-100 wt. % based on the total weight of the polymer. This allows to create microspheres with a high level of bio-based monomers including 100% bio-based. In other embodiments, the copolymer contains less than or equal to 50 wt % of the lactone, for example in the range of from 10 to 50 wt %.

If present, the comonomers are preferably present in the lactone copolymer in an amount of least 1 wt. %, or at least 10 wt. %, more preferably at least 20 wt. % based on the total weight of the copolymer. In some embodiments, the comonomers may be present in a total amount of at least 50 wt. %, or at least 60 wt. %, or at least 80 wt. % based on the total weight of the copolymer. When a comonomer content in the polymer is discussed within the present specification, it is understood as the content of the comonomer as a building block in the copolymer relative to the total polymer weight, and not as a free monomer content of unreacted monomers that may be present in the polymer reaction product.

In some embodiments, it may be preferred that the lactone copolymer comprises at least one acidic monomer. An acidic monomer in this case comprises both an ethylenically unsaturated bond and a carboxylic group. Examples of acidic monomers are (meth)acrylic acid, itaconic acid, maleic acid, fumaric acid and citraconic acid and their esters such as monomethyl itaconate, monoethyl itaconate, monobutyl itaconate. The acidic monomer can be present in amounts up to 70 wt. %, for example in amounts 1-50 wt. %, based on the total polymer weight.

In some embodiments, it may be preferred that the ethylenically unsaturated monomers are substantially free from vinyl aromatic monomers. If included, the amount thereof is preferably less than 10 wt. %, more preferably less than 5 wt. %, most preferably less than 1 wt. % of the total polymer weight. Most preferably, the thermoplastic shell copolymer is free from vinyl aromatic comonomers. An example of a vinyl aromatic monomer is styrene.

In some embodiments, the ethylenically unsaturated monomers comprise small amounts of one or more crosslinking multifunctional monomers, such as one or more of divinyl benzene, ethylene glycol di(meth)acrylate, di(ethylene glycol) di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth)acrylate, dipentaerythritol hexa(meth)acrylate, triallylformal tri(meth)acrylate, allyl methacrylate, trimethylolpropane tri(meth)acrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal, triallyl isocyanate, triallyl isocyanurate, 1,4-butanediol divinyl ether and trivinylcyclohexane or any combination thereof. Particularly preferred are crosslinking monomers that are at least tri-functional. The amounts of crosslinking functional monomers may, for example, be from 0.1 to 5 wt. % of the total polymer weight, more preferably 0.1-3 wt. % and even more preferably 0.1-1 wt. %.

The softening temperature of the polymer shell, normally corresponding to its glass transition temperature (Tg), is preferably within the range from 0 to 350° C., most preferably from 50 to 300° C.

The blowing agent (propellant) is selected such that it has a sufficiently high vapour pressure at temperatures above the softening temperature of the thermoplastic shell to be able to expand the microparticles. In most cases the boiling temperature of the blowing agent is not higher than the softening temperature of the thermoplastic shell. The boiling point at the atmospheric pressure of the blowing agent is preferably in the range from −50 to 250° C., more preferably from −20 to 200° C., most preferably from −20 to 100° C. The amount of the blowing agent in the expandable microspheres is preferably from 5 to 60 wt. %, more preferably from 10 to 50 wt. %, most preferably from 15 to 40 wt. %, particularly most preferably from 15 to 35 wt. % based on the total weight of the microparticles.

The blowing agent can be a single compound or a mixture of compounds. Preferably, the blowing agent is a hydrocarbon or a mixture of hydrocarbons. More preferably, it is a hydrocarbon with 1 to 18 carbon atoms, even more preferably 3 to 12 carbon atoms, most preferably 4 to 10 carbon atoms, or mixtures thereof. The hydrocarbons can be saturated or unsaturated hydrocarbons. The hydrocarbons can be aliphatic, cyclic or aromatic hydrocarbons. Examples of suitable hydrocarbons include n-butane, isobutane n-pentane, isopentane, cyclopentane, neopentane, hexane, isohexane, neo-hexane, cyclohexane, heptane, isoheptane, octane, isooctane, decane, dodecane, isododecane and any combination thereof. Aside from them, other hydrocarbon types can also be used, such as petroleum ether. It is preferable that the blowing agent contains n-butane, isobutane, n-pentane, isopentane, isohexane, isooctane, isododecane or mixtures thereof.

The temperature at which the expansion starts is called Tstart, while the temperature at which maximum expansion is reached is called Tmax. In some applications it is desirable that the microspheres have a high Tstart and high expansion capability, so as to be used in high temperature applications like foaming of thermoplastic materials in e.g. extrusion or injection molding processes. Tstart for the expandable microspheres is preferably from 80 to 300° C., more preferably from 80 to 250° C. In some embodiments, Tstart can be in the range from 190 to 240° C. In other embodiments, lower Tstart temperatures are preferred, such as from 100 to 190° C. Tmax for the expandable microspheres is preferably from 130 to 350° C., most preferably from 150 to 270° C.

The expandable microspheres preferably have a volume median diameter from 1 to 500 µm, more preferably from 3 to 200 µm, most preferably from 3 to 100 µm.

The term expandable microspheres as used herein refers to expandable microspheres that have not previously been expanded, i.e. unexpanded expandable microspheres.

The thermally expandable microspheres according to the present invention have a reduced eco-footprint as they are produced from monomers which are at least partially bio-based. By bio-based it is meant that the monomers are not from a fossil fuel source. The lactones of formula (1) can be produced from biomass via different routes. α-Methylene-γ-butyrolactone (MBL), also known as Tulipalin A, is a naturally occurring substance that can be isolated from tulips. MBL, β-methyl-α-methylene-γ-butyrolactone (MMBL) and γ,γ-dimethyl-α-methylene-γ-butyrolactone can be synthesized from bio-based compounds such as itaconic acid which is produced by fermentation of different carbohydrates. α-Methylene-γ-valerolactone (MVL) can be derived from biomass via levulinic acid by a method developed by DuPont such as described in US 2006/100447.

The bio-based monomers used in the present invention surprisingly impart thermoplastic properties to the thermoplastic shell ensuring that the thermally expandable microspheres expand satisfactorily when heated to form expanded microspheres. The thermoplastic shell comprising the bio-based monomers surprisingly retains the blowing agent therein.

In a further aspect, the present invention relates to a process for the manufacture of thermally expandable microspheres as described above. The process comprises aqueous suspension polymerization of ethylenically unsaturated monomers as described above using a free-radical initiator in the presence of a blowing agent, wherein at least one ethylenically unsaturated monomer is the lactone according to formula (1) as described above. Regarding the kinds and amounts of the monomers and blowing agent, the above description of the expandable microspheres is referred to. The production may follow the same principles as described in U.S. Pat. Nos. 3,615,972, 3,945,956, 4,287,308, 5,536,756, EP 0 486 080, U.S. Pat. No. 6,509,384, WO 2004/072160, WO 2007/091960.

In a typical process of suspension polymerization, the monomer(s) and the blowing agent are mixed together to form a so called oil-phase. The oil-phase is then mixed with an aqueous mixture, for example by stirring, agitation, to form an emulsion. The emulsion formation allows for a manipulation of a size of the resultant emulsion droplets. It is preferable that the emulsion droplets have a median diameter of up to 500 μm and preferably in a range of 3-100 μm. The emulsion formation may be performed by devices known in the art to provide emulsion droplets having a median diameter within the aforementioned range.

The emulsion may be stabilised with so called stabilising chemicals, or suspending agents, as known in the art such as surfactants, polymers or particles.

The preferred stabilisation system is particle stabilisation by a so-called "Pickering Emulsion" processes. The stabilisation of the emulsion droplets is preferred for a number of reasons; without stabilisation a coalescence of the emulsion droplets containing the monomers and the blowing agents may occur. Coalescence has negative effects; such as, a non-uniform emulsion droplet size distribution resulting in undesirable proportions of emulsion droplets with different sizes, which in turn leads to undesirable properties of thermally expandable microspheres after polymerization. Furthermore, stabilisation prevents aggregation of thermally expandable microspheres. In addition, stabilisation may prevent formation of non-uniform thermally expandable microspheres and/or the formation of a non-uniform thermoplastic shell and an incomplete thermoplastic shell of the thermally expandable microspheres. The suspending agent is preferably present in an amount from 1 to 20 wt. % based on the total weight of the monomer(s).

In some embodiments, the suspending agent is selected from the group consisting of salts, oxides and hydroxides of metals like Ca, Mg, Ba, Zn, Ni and Mn, for example one or more of calcium phosphate, calcium carbonate, magnesium hydroxide, magnesium oxide, barium sulphate, calcium oxalate, and hydroxides of zinc, nickel or manganese. These suspending agents are suitably used at a high pH, preferably from 5 to 12, most preferably from 6 to 10. Preferably magnesium hydroxide is used. Alkaline conditions however may facilitate the hydrolysis of the lactone (co)polymer and may in some cases be less preferred.

In other embodiments, it may be advantageous to work at a low pH, preferably from 1 to 6, most preferably from 3 to 5. A suitable suspending agent for this pH range is selected from the group consisting of starch, methyl cellulose, hydroxypropyl methylcellulose, hydroxypropyl methylcellulose, carboxy methylcellulose, gum agar, silica, colloidal clays, oxide and hydroxide of aluminium or iron. Preferably silica is used.

In order to enhance the effect of the suspending agent, it is also possible to add small amounts of one or more co-stabilisers, for example from 0.001 to 1 wt. % based on the total weight of the monomer(s). Co-stabilisers can be organic materials which can be selected, for example, from one or more of water-soluble sulfonated polystyrenes, alginates, carboxymethylcellulose, tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, polyethylenimine, polyvinylalcohol, polyvinylpyrrolidone, polyvinylamine, amphoteric materials such as proteinaceous, materials like gelatin, glue, casein, albumin, glutin and the like, non-ionic materials like methoxycellulose, ionic materials normally classed as emulsifiers, such as soaps, alkyl sulphates and sulfonates and long chain quaternary ammonium compounds.

In some embodiments, the suspending agent may be silica particles with co-stabilisers. The silica particles with co-stabilisers provide a stabilising protective layer on a surface of the thermoplastic shell of the thermally expandable thermoplastic microspheres and the resultant expanded microspheres. Such a combination of silica particles and co-stabilisers is disclosed in U.S. Pat. No. 3,615,972. The co-stabilisers in this case can be selected from: metal ions (such as Cr(III), Mg(II), Ca(II), Al(III) or Fe(III)); a flocculant (such as a poly-condensate oligomer of adipic acid and diethanol amine) with sometimes a reducing agent. The metal ions interact with the silica particles and the flocculants preventing coalescence of the emulsion droplet and therefore stabilise the emulsion droplets. In other embodiments, the silica particles may be modified with organosilane groups as described in PCT/EP2017/067349.

In a suitable, preferably batch-wise, procedure for preparing microspheres of the invention the polymerization is conducted in a reaction vessel as described below. For 100 parts of the monomer phase (suitably including the monomer(s) and the blowing agent, the proportions of which determine proportions of monomer(s) in the polymer shell and the amount of blowing agent in the final product), one or more polymerization initiator, preferably in an amount from 0.1 to 5 parts, aqueous phase, preferably in an amount from 100 to 800 parts, and one or more suspending agent, preferably in an amount from 1 to 20 parts, are mixed and homogenised. The size of the droplets of the monomer phase obtained determines the size of the final expandable microspheres in accordance with the principles described in e.g. U.S. Pat. No. 3,615,972, which can be applied for all similar production methods with various suspending agents. The suitable pH depends on the suspending agent used, as described above.

The emulsion obtained is subjected to conventional radical polymerization using at least one initiator. Typically, the initiator is used in an amount from 0.1 to 5 wt. % based on the weight of the monomer phase. Conventional radical polymerization initiators are selected from one or more of organic peroxides such as dialkyl peroxides, diacyl peroxides, peroxy esters, peroxy dicarbonates, or azo compounds. Suitable initiators include dicetyl peroxydicarbonate, di(4-tert-butylcyclohexyl) peroxydicarbonate, dioctanyl peroxide, dibenzoyl peroxide, dilauroyl peroxide, didecanoyl peroxide, tert-butyl peracetate, tert-butyl perlaurate, tert-butyl perbenzoate, tert-butyl hydroperoxide, cumene hydroperoxide, cumene ethylperoxide, diisopropylhydroxy dicarboxylate, 2,2'-azo-bis(2,4-dimethyl valeronitrile), 2,2'-azobis(2-methylpropionate), 2,2'-azobis[2-methyl-N-(2-hydroxyethyl)propionamide] and the like. It is also possible to initiate the polymerization with radiation, such as high energy ionising radiation, UV radiation in combination with a photoinitiator or microwave-assisted initiation.

When the polymerization is essentially complete, microspheres are normally obtained as an aqueous slurry or dispersion, which can be used as such or dewatered by any conventional means, such as bed filtering, filter pressing, leaf filtering, rotary filtering, belt filtering or centrifuging to obtain a so called wet cake. It is also possible to dry the microspheres by any conventional means, such as spray drying, shelf drying, tunnel drying, rotary drying, drum drying, pneumatic drying, turbo shelf drying, disc drying or fluidised bed drying.

If appropriate, the microspheres may at any stage be treated to reduce the amount of residual unreacted monomers, for example by any of the procedures described in the earlier mentioned WO 2004/072160 or U.S. Pat. No. 4,287, 308.

A further aspect of the invention concerns expanded microspheres obtained by expanding expandable microspheres as described above. The expansion typically results in a particle diameter from 2 to 5 times larger than the diameter of the unexpanded microspheres. The density of the expanded microspheres may, for example, be from 0.005 to 0.06 g/cm3. The expansion is effected by heating the expandable microspheres at a temperature above Tstart, preferably at a temperature of at least 100° C. The upper temperature limit is set by when the microspheres start collapsing and depends on the exact composition of the polymer shell and the blowing agent. The ranges for the Tstart and Tmax can be used for finding a suitable expansion temperature. In most cases a temperature in the range 100 to 300° C., or more preferably in the range 150 to 250° C., is suitable. The density of the expanded microspheres can be controlled by selecting temperature and time for the heating. The expansion can be effected by any suitable means for heating in any suitable device, as described in e.g. EP 0 348 372, WO 2004/056549 or WO 2006/009643.

The expandable and expanded microspheres of the invention are useful in various applications such as printing inks (such as waterborne inks, solvent borne inks, plastisols, thermal printer paper, UV-curing inks etc. e.g. for textile, wall paper etc.), putties, sealants, toy-clays, underbody coatings, adhesives, debonding of adhesives, artificial leather, genuine leather, paint, non-woven materials, paper and board, coatings (e.g anti-slip coating etc.) for various materials such as paper, board, plastics, metals and textile, explosives, cable insulations, thermoplastics (such as polyethylene, polyvinyl chloride, poly(ethylene-vinylacetate), polypropylene, polyamides, poly(methyl methacrylate), polycarbonate, acrylonitrile-butadiene-styrene polymer, polylactic acid, polyoxymethylene, polyether ether ketone, polyetherimide, polyether sulfone, polystyrene and polytetrafluoroethylene) or thermoplastic elastomers (such as styrene-ethylene-butylene-styrene copolymer, styrene-butadiene-styrene copolymer, thermoplastic polyurethanes and thermoplastic polyolefins), styrene-butadiene rubber, natural rubber, vulcanized rubber, silicone rubbers, thermosetting polymers (such as epoxies, polyurethanes and polyesters). In some of these applications expanded microspheres are particularly advantageous, such as in putties, sealants, toy-clays, genuine leather, paint, explosives, cable insulations, porous ceramics, and thermosetting polymers (like epoxies, polyurethanes and polyesters). In some cases it is also possible to use a mixture of expanded and expandable microspheres of the invention, for example in underbody coatings, silicone rubbers and light weight foams.

The invention will be further described in connection with the following examples which, however, are not to be interpreted to limit the scope of the invention. If not otherwise stated, all parts and percentages refer to parts and percent by weight.

EXAMPLES

The expansion properties were evaluated on dry particles on a Mettler Toledo TMA/SDTA851e with STARe software using a heating rate of 20° C./min and load (net.) of 0.06 N. Tstart is the temperature at which the expansion starts, Tmax is the temperature at which maximum expansion is obtained and TMA density is the density of the microspheres at Tmax. The lower the TMA density, the better the microspheres expand. The TMA density of 1 g/ml means no expansion.

The particle size and size distribution was determined by laser light scattering on a Malvern Mastersizer Hydro 2000 SM apparatus on wet samples. The median particle size is presented as the volume median diameter d(0.5).

The amount of the blowing agent was determined by thermal gravimetric analysis (TGA) on a Mettler Toledo TGA/DSC 1 with STARe software. All samples were dried prior to analysis in order to exclude as much moisture as possible and if present also residual monomers. The analyses were performed under an atmosphere of nitrogen using a heating rate at 20° C. min$^{-1}$ starting at 30° C.

Example 1

A reaction mixture containing Mg(OH)2-stabilised organic droplets in water was created by mixing the phases and stirring vigorously until a suitable droplet size had been achieved. The water dispersion contained 3.4 parts of Mg(OH)2 and 284 parts of water. The organic droplets contained 2.0 parts of dilauroyl peroxide, 27 parts of isopentane and 0.3 parts of trimethylolpropane trimethacrylate. Acrylonitrile (AN) and α-methylene-γ-valerolactone (MVL) were added in the amounts as indicated in Table 1 in parts per weight. Polymerization was performed at 62° C. in a sealed reactor under agitation during 20 hours. After cooling to room temperature a sample of the obtained microsphere slurry was removed for determination of the particle size distribution. After filtration, washing and drying the particles were analyzed by TMA. The dry particles contained about 27 wt. % of isopentane and had a median particle size of about 74 μm. The TMA-results are found in Table 1.

Example 2

A dispersion comprising 242 parts of water, 30.7 parts of 50 wt. % surface-modified colloidal silica (Bindzil, 80 m2/g, particle size 32 nm surface-modified with 50% propylsilyl/ 50% glycerolpropylsilyl) was prepared and maintained at a pH of about 4.5. The aqueous dispersion was mixed with an organic phase that contained 2.0 parts of dilauroyl peroxide, 27 parts of isopentane and 0.3 parts of trimethylolpropane trimethacrylate. Acrylonitrile (AN) and α-methylene-γ-valerolactone (MVL) were added in the amounts as indicated in Table 1. Polymerization was performed at 62° C. in a sealed reactor under agitation during 20 hours. After cooling to room temperature a sample of the obtained microsphere slurry was removed for determination of the particle size distribution. After filtration, washing and drying the particles were analyzed by TMA. The dry particles contained about 19 wt. % of isopentane. The TMA-results and particle sizes are found in Table 1.

Examples 3-6

Microspheres were prepared in a plurality of polymerization experiments performed as in Example 2 except for monomers and hydrocarbon, which were added according to Table 1. The dry particles contained about 16-21 wt. % of isooctane. The TMA-results and particle sizes are found in Table 1.

TABLE 1

MVL with AN

| Ex | Copolymer | Composition (parts) | Blowing agent | Stab. system | Size (μm) | $T_{start}$ (°C.) | $T_{max}$ (°C.) | TMA density (g/ml) |
|---|---|---|---|---|---|---|---|---|
| 1 | MVL/AN | 40/60 | IP | $Mg(OH)_2$ | 74 | 155 | 199 | 0.016 |
| 2 | MVL/AN | 40/60 | IP | $SiO_2$ | 5 | 169 | 190 | 0.016 |
| 3 | MVL/AN | 55/45 | IO | $SiO_2$ | 16 | 190 | 192 | 0.68 |
| 4 | MVL/AN | 70/30 | IO | $SiO_2$ | 5 | 224 | 227 | 0.24 |
| 5 | MVL/AN | 85/15 | IO | $SiO_2$ | 7 | 222 | 229 | 0.031 |
| 6 | MVL/AN | 100/0 | IO | $SiO_2$ | 8 | 226 | 243 | 0.060 |

MVL = α-methylene-γ-valerolactone,
AN = acrylonitrile,
IP = isopentane,
IO = isooctane The choice of blowing agent (isopentane or isooctane) was dependent on the Tg of the polymer, to better match the volatization of the blowing agent with the softening of the polymer shell. For lower Tstart a blowing agent with a lower boiling point (isopentane) was used and for higher Tstart a blowing agent with a higher boiling point (isooctane) was used.

From Table 1 it can be seen that copolymers of MVL with AN with different amounts can be used to prepare thermally expandable microspheres with good expansion properties such as low TMA density and high expansion temperature. The range 55-70% MVL seems to give less good properties although expansion is still possible. It may therefore be advantageous to either use copolymers with the MVL content lower than 50 wt. % or higher than 75 wt. % in the polymer, based on the total weight of the monomers. Polymers with 75-100 wt. % MVL are preferred since this allows to prepare microspheres with a high level of bio-renewable monomers, up to 100 wt. % (Example 6). An additional advantage of polymers with a high MVL content is the high starting expansion temperature Tstart (>200° C.) as seen for Examples 4-6, which is particularly suitable for high temperature end applications. High levels of MVL correspond to low levels of comonomer AN.

Example 7

A reaction mixture containing Mg(OH)2-stabilised organic droplets in water was created by mixing the phases and stirring vigorously until a suitable droplet size had been achieved. The water dispersion contained 6.5 parts of Mg(OH)2 and 221 parts of water. The organic droplets contained 0.52 parts of di(4-tert-butylcyclohexyl) peroxydicarbonate, 34 parts of isopentane and 0.3 parts of trimethylolpropane trimethacrylate. Acrylonitrile (AN), α-methylene-γ-valerolactone (MVL) and methyl methacrylate (MMA) were added in the amounts as indicated in Table 2 in parts per weight. Polymerization was performed in a sealed reactor under agitation at 56° C. during 6 hours followed by 62° C. during 5 hours. After cooling to room temperature a sample of the obtained microsphere slurry was removed for determination of the particle size distribution. After filtration, washing and drying the particles were analyzed by TMA. The dry particles contained about 25 wt. % of isopentane and had a median particle size of about 26 μm. The TMA-results are found in Table 2.

Examples 8-10

Microspheres were prepared in a plurality of polymerization experiments performed as in Examples 1 except for monomers, which were added according to Table 2. The dry particles contained about 17-24 wt. % of isopentane. The TMA-results and particle sizes are found in Table 2.

Example 11

A reaction mixture containing Mg(OH)2-stabilised organic droplets in water was created by mixing the phases and stirring vigorously until a suitable droplet size had been achieved. The water dispersion contained 4.9 parts of Mg(OH)2 and 363 parts of water. The organic droplets contained 2.0 parts of dilauroyl peroxide, 25 parts of isooctane and 0.4 parts of trimethylolpropane trimethacrylate. α-Methylene-γ-valerolactone (MVL), methacrylamide (MAAM) and methacrylonitrile (MAN) were added in the amounts as indicated in Table 2 in parts per weight. Polymerization was performed in a sealed reactor under agitation at 62° C. during 11 hours followed by 80° C. during 4 hours. After cooling to room temperature a sample of the obtained microsphere slurry was removed for determination of the particle size distribution. After filtration, washing and drying the particles were analyzed by TMA. The dry particles contained about 23 wt. % of isooctane and had a median particle size of about 74 μm. The TMA-results are found in Table 2.

Example 12

A dispersion comprising 259 parts of water, 8.6 parts of colloidal silica (Bindzil 40 wt. %, particle size 12 nm), 60 parts of NaCl and 0.7 parts of a poly-condensate oligomer of adipic acid and diethanol amine was prepared and maintained at a pH of approximately 3.2. The aqueous dispersion was mixed with an organic phase that contained 2.0 parts of dilauroyl peroxide, 27 parts of isopentane and 0.3 parts of trimethylolpropane trimethacrylate. Acrylonitrile (AN), α-methylene-γ-valerolactone (MVL), methacrylonitrile (MAN), methyl methacrylate (MMA) and methacrylic acid (MAA) were added in the amounts as indicated in Table 2. 0.06 parts of Fe(NO3)3 was added and the polymerization was performed at 62° C. in a sealed reactor under agitation during 20 hours. After cooling to room temperature a sample of the obtained microsphere slurry was removed for determination of the particle size distribution. After filtration, washing and drying the particles were analyzed by TMA. The dry particles contained about 24 wt. % of isopentane. The TMA-results and particle size are found in Table 2.

TABLE 2

MVL with AN and other comonomers

| Ex | Copolymer | Composition (parts) | Blowing agent | Stab. system | Size (μm) | $T_{start}$ (° C.) | $T_{max}$ (° C.) | TMA density (g/ml) |
|---|---|---|---|---|---|---|---|---|
| 7 | MVL/AN/MMA | 20/60/20 | IP | $Mg(OH)_2$ | 26 | 131 | 154 | 0.013 |
| 8 | MVL/AN/MMA | 20/60/20 | IP | $Mg(OH)_2$ | 70 | 113 | 176 | 0.011 |
| 9 | MVL/AN/MA | 20/60/20 | IP | $Mg(OH)_2$ | 66 | 124 | 159 | 0.023 |
| 10 | MVL/AN/MAN | 20/60/20 | IP | $Mg(OH)_2$ | 51 | 122 | 208 | 0.011 |
| 11 | MVL/MAN/MAAM | 20/40/40 | IO | $Mg(OH)_2$ | 74 | 191 | 234 | 0.0079 |
| 12 | MVL/AN/MAN/MMA/MAA | 20/17/17/20/26 | IP | $SiO_2$ | 54 | 156 | 221 | 0.016 |

MVL = α-methylene-γ-valerolactone,
AN = acrylonitrile,
MAA = methacrylic acid,
MAN = methacrylonitrile,
MA = methyl acrylate,
MMA = methyl methacrylate,
MAAM = methacrylamide,
IP = isopentane,
IO = isooctane From Table 2 it can be seen that copolymers of MVL with AN and other comonomers can be used to prepare expandable microspheres with excellent expansion properties such as low TMA density.

Examples 13-17

Microspheres were prepared in a plurality of polymerization experiments performed as in Example 11 except for monomers, which were added according to Table 3. The dry particles of Examples 13-14 and Examples 16-17 contained about 16-25 wt. % of isooctane. The dry particles of Example 15 contained a high amount of isooctane (about 54 wt. %) which plausibly can be explained by a low degree of polymerization which results in a relatively high level of isooctane compared to polymer. The TMA-results and particle sizes are found in Table 3.

As can be seen, the microspheres according to the invention (Examples 11 and 14-19) can be expanded at high temperature and have comparable or some even better properties e.g. lower TMA density, compared to the microspheres without bio-based monomers (Example 13).

Examples 18-19

Microspheres were prepared in a plurality of polymerization experiments performed as in Examples 1 except for monomers, which were added according to Table 3. The dry particles contained about 24-28 wt. % of isopentane. The TMA-results and particle sizes are found in Table 3.

Examples 20-24

Microspheres were prepared in a plurality of polymerization experiments performed as in Examples 1 except for

TABLE 3

MVL with MAN, MAAM, AN

| Ex | Copolymer | Composition (parts) | Blowing agent | Stab. system | Size (μm) | $T_{start}$ (° C.) | $T_{max}$ (° C.) | TMA density (g/ml) |
|---|---|---|---|---|---|---|---|---|
| 13 | MAN/MAAM (ref) | 50/50 | IO | $Mg(OH)_2$ | 59 | 212 | 276 | 0.015 |
| 14 | MVL/MAN/MAAM | 10/45/45 | IO | $Mg(OH)_2$ | 69 | 202 | 259 | 0.0091 |
| 15 | MVL/MAN/MAAM | 25/25/50 | IO | $Mg(OH)_2$ | 73 | 212 | 228 | 0.15 |
| 16 | MVL/MAN | 50/50 | IO | $Mg(OH)_2$ | 34 | 220 | 225 | 0.017 |
| 17 | MVL/MAAM | 50/50 | IO | $Mg(OH)_2$ | 65 | See comment a) | | |
| 18 | MVL/AN/MAN | 30/45/25 | IP | $Mg(OH)_2$ | 48 | 125 | 200 | 0.0097 |
| 19 | MVL/AN/MAN | 50/25/25 | IP | $Mg(OH)_2$ | 54 | 153 | 196 | 0.027 | a) Expansion is observed under microscope equipped with a heating stage. Several particles expanded between 160-250° C.
MVL = α-methylene-γ-valerolactone,
AN = acrylonitrile,
MAN = methacrylonitrile,
MAAM = methacrylamide,
IP = isopentane,
IO = isooctane Example 13 is a comparative example wherein no lactone comonomers are used. Here a copolymer of methacrylonitrile and methacrylamide is used.

acrylonitrile (AN), α-methylene-γ-butyrolactone (MBL), methacrylonitrile (MAN), methyl methacrylate (MMA) and methyl acrylate (MA) which were added in the amounts as indicated in Table 4. In Example 20 no trimethylolpropane trimethacrylate was added while in Examples 21-24 trimethylolpropane trimethacrylate was added according to Example 1. Blowing agents were added according to Table 4 in the same amounts as in Example 1. The dry particles contained about 17-25 wt. % of hydrocarbon. The TMA-results and particle sizes are found in Table 4.

TABLE 4

MBL copolymers

| Ex | Copolymer | Composition (parts) | Blowing agent | Stab. system | Size (μm) | $T_{start}$ (°C.) | $T_{max}$ (°C.) | TMA density (g/ml) |
|---|---|---|---|---|---|---|---|---|
| 20 | MBL/AN | 40/60 | IP | Mg(OH)$_2$ | 19 (a) | 153 | 182 | 0.023 |
| 21 | MBL/AN | 40/60 | IO | Mg(OH)$_2$ | 45 | 173 | 189 | 0.053 |
| 22 | MBL/AN/MMA | 20/60/20 | IP | Mg(OH)$_2$ | 37 | 109 | 161 | 0.010 |
| 23 | MBL/AN/MA | 20/60/20 | IP | Mg(OH)$_2$ | 40 | 114 | 156 | 0.033 |
| 24 | MBL/AN/MAN | 20/60/20 | IP | Mg(OH)$_2$ | 59 | 118 | 196 | 0.0074 |

(a) The particles had aggregated so the size was estimated by optical microscopy
MBL = α-methylene-γ-butyrolactone,
AN = acrylonitrile,
MAN = methacrylonitrile,
MA = methyl acrylate,
MMA = methyl methacrylate,
IP = isopentane,
IO = isooctane Example 25

A dispersion comprising 246 parts of water, 26.8 parts of 50 wt. % surface-modified colloidal silica (Levasil, particle size 60 nm surface-modified with 40% propylsilyl/60% glycerolpropylsilyl) was prepared and maintained at a pH of approx. 4.5. The aqueous dispersion was mixed with an organic phase that contained 2.0 parts of dilauroyl peroxide, 27 parts of isopentane and 0.3 parts of trimethylolpropane trimethacrylate. Acrylonitrile (AN) and α-methylene-γ-butyrolactone (MBL) were added in the amounts as indicated in Table 5. Polymerization was performed at 62° C. in a sealed reactor under agitation during 20 hours. After cooling to room temperature a sample of the obtained microsphere slurry was removed for determination of the particle size distribution. After filtration, washing and drying the particles were analysed by TMA. The dry particles contained about 17 wt. % of isopentane. The TMA-results and particle sizes are found in Table 5.

Examples 26-30

Microspheres were prepared in a plurality of polymerization experiments performed as in Example 25 except for acrylonitrile (AN), α-methylene-γ-butyrolactone (MBL), methacrylonitrile (MAN), methyl methacrylate (MMA) and methyl acrylate (MA) which were added in the amounts as indicated in Table 5. Blowing agents were added according to Table 5 in the same amounts as in Example 25. The dry particles of Examples 26-29 contained about 16-17 wt. % of isopentane while the particles of Example 30 contained 5 wt. % of isooctane. The TMA-results and particle sizes are found in Table 5.

TABLE 5

MBL copolymers

| Ex | Copolymer | Composition (parts) | Blowing agent | Stab. system | Size (μm) | $T_{start}$ (°C.) | $T_{max}$ (°C.) | TMA density (g/ml) |
|---|---|---|---|---|---|---|---|---|
| 25 | MBL/AN | 40/60 | IP | SiO$_2$ | 24 | 150 | 185 | 0.038 |
| 26 | MBL/AN/MMA | 20/60/20 | IP | SiO$_2$ | 21 | 135 | 179 | 0.010 |
| 27 | MBL/AN/MA | 20/60/20 | IP | SiO$_2$ | 27 | 124 | 164 | 0.015 |
| 28 | MBL/AN/MAN | 20/60/20 | IP | SiO$_2$ | 31 | 141 | 191 | 0.011 |
| 29 | MBL/AN/MAN | 50/32/18 | IP | SiO$_2$ | 27 | 147 | 201 | 0.013 |
| 30 | MBL | 100 | IO | SiO$_2$ | 37 | See comment a) | | | a) Expansion is observed under microscope equipped with a heating stage. At 180-200° C. a plurality of microspheres expanded about 4 times in diameter.
MBL = α-methylene-γ-butyrolactone,
AN = acrylonitrile,
MAN = methacrylonitrile,
MA = methyl acrylate,
MMA = methyl methacrylate,
IP = isopentane,
IO = isooctane The above examples show that it is possible to prepare thermally expandable microspheres from polymers largely based on bio-renewable lactone monomers. In some cases the polymer was prepared from 100% bio-based monomer MVL or MBL, which allows preparation of microspheres with a 100% bio-based polymer shell. It is also possible to prepare microspheres with a high expansion temperature—such as higher than 150° C., and some cases even higher than 190° C. or 200° C.

Examples 31-36 (Comparative)

An aqueous dispersion was prepared comprising 242 parts of water, 30.5 parts of the Bindzil colloidal silica used in Example 2 (i.e. 80 m2/g, particle size 32 nm, surface-modified with 50% propylsilyl/50% glycerolpropylsilyl groups), 9.6 parts of 1M aqueous sodium hydroxide, and 15.3 parts of 10 wt % aqueous acetic acid. The aqueous dispersion was mixed with an organic phase that contained 2.0 parts of dilauroyl peroxide, 27 parts of isopentane and 0.3 parts of trimethylolpropane trimethacrylate. Acrylonitrile (AN) and caprolactone (CL) were added in the amounts as indicated in Table 6. Polymerization was performed at 62° C. in a sealed reactor under agitation during 20 hours. After cooling to room temperature a sample of the obtained microsphere slurry was removed for determination of the particle size distribution. After filtration, washing and drying the particles were analysed by TMA. The TMA-results and particle sizes are found in Table 6.

TABLE 6

Caprolactone copolymers

| Ex | Copolymer | Weight of Monomer (parts) | Blowing agent | Stab. system | Size (µm) | $T_{start}$ (° C.) | $T_{max}$ (° C.) | TMA density (g/ml) |
|---|---|---|---|---|---|---|---|---|
| 31 | CL/AN | 10/90 | IP | $SiO_2$ | 28.7 | 20.8 | 54.4 | >1 |
| 32 | CL/AN | 30/70 | IP | $SiO_2$ | 24.0 | 21.2 | 53.7 | >1 |
| 33 | CL/AN | 50/50 | IP | $SiO_2$ | 18.1 | 21.6 | 66.9 | >1 |
| 34 | CL/AN | 70/30 | IP | $SiO_2$ | 8.9 | 22.0 | 53.7 | >1 |
| 35 | CL/AN | 85/15 | IP | $SiO_2$ | a) | a) | a) | >1 |
| 36 | CL/AN | 95/5 | IP | $SiO_2$ | a) | a) | a) | >1 |

AN = acrylonitrile,
CL = caprolactone,
IP = isopentane
a) No obvious formation of microspheres.

Caprolactone is a lactone, but does not fall within the scope of formula (1) above. The increased densities of the microspheres prepared using caprolactone are indicative of higher agglomeration of microspheres, and also a lower yield of microspheres. The blowing agent content of the samples was not measured, since the proportion of microspheres in the sample was extremely low.

These results demonstrate that, under corresponding synthesis conditions, its copolymers with acrylonitrile do not form expandable microspheres of sufficient quality or of sufficiently low density.

Examples 37-42 (Comparative)

The procedure used was identical to the procedure used for Examples 31-36 above, except that the caprolactone was replaced with a corresponding weight of lactic acid (LA), in the amounts indicated in Table 7.

TABLE 7

| Ex | Copolymer | Weight of Monomer (parts) | Blowing agent | Stab. system | Size (µm) | $T_{start}$ (° C.) | $T_{max}$ (° C.) | TMA density (g/ml) |
|---|---|---|---|---|---|---|---|---|
| 37 | LA/AN | 10/90 | IP | $SiO_2$ | 26.3 | 21.6 | 53.8 | >1 |
| 38 | LA/AN | 30/70 | IP | $SiO_2$ | 22.2 | 34.4 | 72.1 | >1 |
| 39 | LA/AN | 50/50 | IP | $SiO_2$ | 6.6 | 20.4 | 65.4 | >1 |
| 40 | LA/AN | 70/30 | IP | $SiO_2$ | 5.2 | 21.5 | 55.7 | >1 |
| 41 | LA/AN | 85/15 | IP | $SiO_2$ | 2.7 | 21.8 | 40 | >1 |
| 42 | LA/AN | 95/5 | IP | $SiO_2$ | a) | a) | a) | a) |

AN = acrylonitrile,
LA = lactic acid,
IP = isopentane
a) No obvious formation of microspheres. Density not measured.

As with the caprolactone-containing examples, the densities were high (>1), indicating a high proportion of agglomeration, and the proportion of microspheres in the samples was extremely low. The amount of blowing agent in the samples was, therefore, not measured.

These results demonstrate that replacing the lactone of formula (1) with an alternative bio-based (co)monomer not of formula (1) does not necessarily form expandable microspheres of sufficient quality or of sufficiently low density under corresponding synthesis conditions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. Thermally expandable microspheres having a size of from 1 to 100 microns and comprising:
    a thermoplastic polymer shell encapsulating a blowing agent that is isopentane, isooctane, or combinations thereof,
    wherein the thermoplastic polymer shell comprises a homopolymer of α-methylene-γ-valerolactone (MVL) and/or α-methylene-γ-butyrolactone (MBL).

2. The microspheres according to claim 1 having a particle size of from 8 to 37 microns.

3. A process for the manufacture of the microspheres according to claim 1, comprising a step of polymerizing the α-methylene-γ-valerolactone (MVL) and/or the α-methylene-γ-butyrolactone (MBL) to form the homopolymer by aqueous suspension polymerization using a free-radical initiator in the presence of the blowing agent.

4. The process according to claim 3, further comprising the step of stabilizing the suspension with $SiO_2$.

5. A process for preparing expanded microspheres comprising heating the thermally expandable microspheres according to claim 1 so that the thermally expandable microspheres expand.

6. Expanded microspheres obtained by thermal expansion of the microspheres according to claim 1.

* * * * *